(12) United States Patent
Yamada et al.

(10) Patent No.: US 7,138,632 B2
(45) Date of Patent: Nov. 21, 2006

(54) RADIATION DETECTOR

(75) Inventors: Takashi Yamada, Gunma (JP); Shigenori Sekine, Gunma (JP); Toshikazu Yanada, Gunma (JP); Motomi Oshika, Gunma (JP)

(73) Assignee: Nihon Kessho Kogaku Co., Ltd., Gunma (JP)

( * ) Notice: Subject to any disclaimer, the term of this patent is extended or adjusted under 35 U.S.C. 154(b) by 0 days.

(21) Appl. No.: 10/528,694

(22) PCT Filed: Aug. 3, 2004

(86) PCT No.: PCT/JP2004/011418

§ 371 (c)(1),
(2), (4) Date: Mar. 22, 2005

(87) PCT Pub. No.: WO2005/062073

PCT Pub. Date: Jul. 7, 2005

(65) Prior Publication Data

US 2006/0076497 A1 Apr. 13, 2006

(30) Foreign Application Priority Data

Dec. 22, 2003 (JP) ............................ 2003-425156

(51) Int. Cl.
*G01T 1/20* (2006.01)
(52) U.S. Cl. ............... 250/367; 250/336.1; 250/361 R; 250/370.11
(58) Field of Classification Search ............. 250/336.1, 250/367, 366, 361 R, 363.01, 370.11
See application file for complete search history.

(56) References Cited

U.S. PATENT DOCUMENTS

| | | | | |
|---|---|---|---|---|
| 4,090,081 A | * | 5/1978 | Takami et al. | ............... 250/368 |
| 5,216,252 A | * | 6/1993 | Boone et al. | ............ 250/486.1 |
| 5,393,981 A | * | 2/1995 | Szabo et al. | ................. 250/367 |
| 5,493,121 A | * | 2/1996 | Fitzpatrick | ................... 250/369 |
| 6,133,614 A | | 10/2000 | Shoji et al. | |
| 6,362,480 B1 | * | 3/2002 | Peter et al. | ................. 250/366 |
| 6,448,559 B1 | * | 9/2002 | Saoudi et al. | ............... 250/367 |
| 6,553,092 B1 | * | 4/2003 | Mattson et al. | ............... 378/19 |
| 6,570,160 B1 | * | 5/2003 | Maekawa et al. | ........... 250/367 |
| 6,844,570 B1 | | 1/2005 | Sekine et al. | |

FOREIGN PATENT DOCUMENTS

| | | |
|---|---|---|
| JP | 5-11054 A | 1/1993 |
| JP | 05-011054 A | 1/1993 |
| JP | 07-020245 A | 1/1995 |
| JP | 7-20245 A | 1/1995 |
| JP | 9-61536 A | 3/1997 |
| JP | 2003-501666 A | 1/2003 |
| JP | 2003-84066 A | 3/2003 |
| WO | WO 00/75691 A1 | 12/2000 |

* cited by examiner

*Primary Examiner*—David Porta
*Assistant Examiner*—Mark R. Gaworecki
(74) *Attorney, Agent, or Firm*—Sughrue Mion, PLLC

(57) ABSTRACT

A plurality of optical transducers converts the first radiation to a first light having a first wavelength, and converts the second radiation to a second light having a second wavelength. A shielding unit is arranged between the optical transducers to shield the first radiation, the second radiation, the first light, and the second light. A plurality of first photoelectric converters that corresponds to each of the optical transducers outputs a first electrical signal based on intensity of the first light. A plurality of second photoelectric converters that corresponds to each of the optical transducers outputs a second electrical signal based on intensity of the second light.

9 Claims, 10 Drawing Sheets

RADIATION DETECTOR

TECHNICAL FIELD

The present invention relates to a radiation detector that detects spatial distribution of radiation.

BACKGROUND ART

In the field of nuclear medicine, positron emission tomography (PET) devices have been the focus of attention. A target substance having positron emission capability is introduced into a subject. The target substance emits γ-rays due to electron-positron pair annihilation. PET devices measure the spatial distribution of the concentration of the γ-rays emitted from the target substance at a specific area. The PET device then performs imaging process based on the spatial distribution of the concentration of the γ-rays and, from the image processing, detects accumulations of the target substance in the specific area.

For example, fluorodeoxyglucose (FDG) is injected into the body of a patient and, PET devices detect a developing malignant tumor by measuring spatial distribution of the concentration of the γ-rays emitted from the FDG and perform image processing based on the measured spatial distribution of the concentration of the γ-rays. The FDG is created by binding a radio-isotope to pseudo glucose. Glucose metabolism is about three times to eight times higher in a malignant tumor, such as cancer, than a normal cell. Therefore, there is a higher concentration of the pseudo glucose at malignant tumors. Because FDG, which is injected into the subject, contains pseudo glucose, the concentration of γ-rays, which are generated due to the presence of the FDG, changes at the location of a malignant tumor. As a result, it becomes possible to detect malignant tumors with PET devices. PET devices are sensitive enough to detect a slight lesion even if the lesion cannot be found by computerized tomography (CT) devices. This is greatly contributing to the early detection of cancers.

However, the spatial resolution of PET devices is inferior to that of CT devices because of their configuration. In other words, PET devices can detect slight lesions but cannot identify the precise location of the lesions. As a countermeasure, instead of using just PET devices to capture in-vivo images, so-called PET-CT devices have already been put into practice in which a PET device and a CT device are combined to capture images of the same subject. In other words, a PET device is used to detect whether a lesion is present, and a CT device is used to capture images of an in vivo structure within the subject. The images are then superimposed to identify the location of the lesion, which has been detected by the PET device. Although CT devices are inferior to PET devices in detecting the presence of the lesion, the CT devices have excellent spatial resolution. Therefore, PET-CT devices are advantageous in that they can detect a slight lesion with high precision and identify the exact location of the lesion (see Japanese Patent KOHYO Publication No. 2003-501666).

DISCLOSURE OF THE INVENTION

A radiation detector according to the present invention detects how first radiation and second radiation are spatially distributed, and includes a plurality of optical transducers each of which converts the first radiation incident, to light having a first wavelength, and converts the second radiation to light having a second wavelength; a shielding unit that is arranged between two of the optical transducers to prevent passing of the first radiation, the second radiation, and the light obtained by the optical transducer; a plurality of first photoelectric converters that are arranged along the optical transducers in a one-to-one correspondence, and that output electrical signals according to the intensity of the light having the first wavelength; and a plurality of second photoelectric converters that are arranged along the optical transducers in a one-to-one correspondence, and that output electrical signals according to the intensity of the light having the first wavelength.

The radiation detector according to the present invention includes a plurality of optical transducers that receive the first radiation and the second radiation to perform optical conversion on both of them. Therefore, occurrence of misalignment in different radiations can be prevented upon detection of their spatial distributions.

In the radiation detector according to the present invention, the first radiation is γ-rays, and the first photoelectric converter includes a photomultiplier in the above aspect of the present invention.

Moreover, in the radiation detector according to the present invention, the second radiation represents X-rays, and the second photoelectric converter includes a photodiode in the above aspect of the present invention.

Furthermore, in the radiation detector according to the present invention, the first photoelectric converter is arranged on downstream of the optical transducer in an advance direction of the first radiation and the second radiation, and the second photoelectric converter is arranged on a side plane of the optical transducer in the advance direction of the first radiation and the second radiation in the above aspect of the present invention.

Moreover, in the radiation detector according to the present invention, the optical transducer includes a scintillator array with scintillators that are one-dimensionally arranged, and the second photoelectric converter includes a photodiode array with photodiodes that are one-dimensionally arranged on the side plane of the scintillator array in the advance direction of the first radiation and the second radiation so that the photodiodes correspond to the scintillators, respectively in the above aspect of the present invention.

Furthermore, in the radiation detector according to the present invention, the photodiode array includes a wiring structure extended from the photodiodes to the downstream in the advance direction of the first radiation and the second radiation in the above aspect of the present invention.

Moreover, in the radiation detector according to the present invention, the photodiode array includes a wiring structure extended from the photodiodes to the downstream in the advance direction of the first radiation and the second radiation, and further extended along the array direction of the photodiodes in the above aspect of the present invention.

Furthermore, in the radiation detector according to the present invention, the scintillator array and the photodiode array are arranged in plural numbers in a direction perpendicular to the array direction of the scintillators in the above aspect of the present invention.

Moreover, in the radiation detector according to the present invention, the first photoelectric converter is arranged on the downstream of the optical transducer in an incident direction of the first radiation and the second radiation, and the second photoelectric converter includes an element that passes the first radiation and the second radiation, and is arranged on upstream of the optical transducer in the incident direction of the first radiation and the second radiation in the above aspect of the present invention.

BEST MODE FOR CARRYING OUT THE INVENTION

Exemplary embodiments of a radiation detector according to the present invention are explained in detail below with reference to the accompanying drawings. It is noted that the drawings are schematic, and therefore, a relation between a thickness and a width of each part and a ratio of thicknesses in respective parts are different from real ones. Furthermore, the drawings may include some parts in which a mutual relation and a ratio between dimensions are different from each other. In the explanation below, a first radiation is γ-rays and a second radiation represents X-rays, but the present invention is not limited by these specific conditions.

Figure 1:
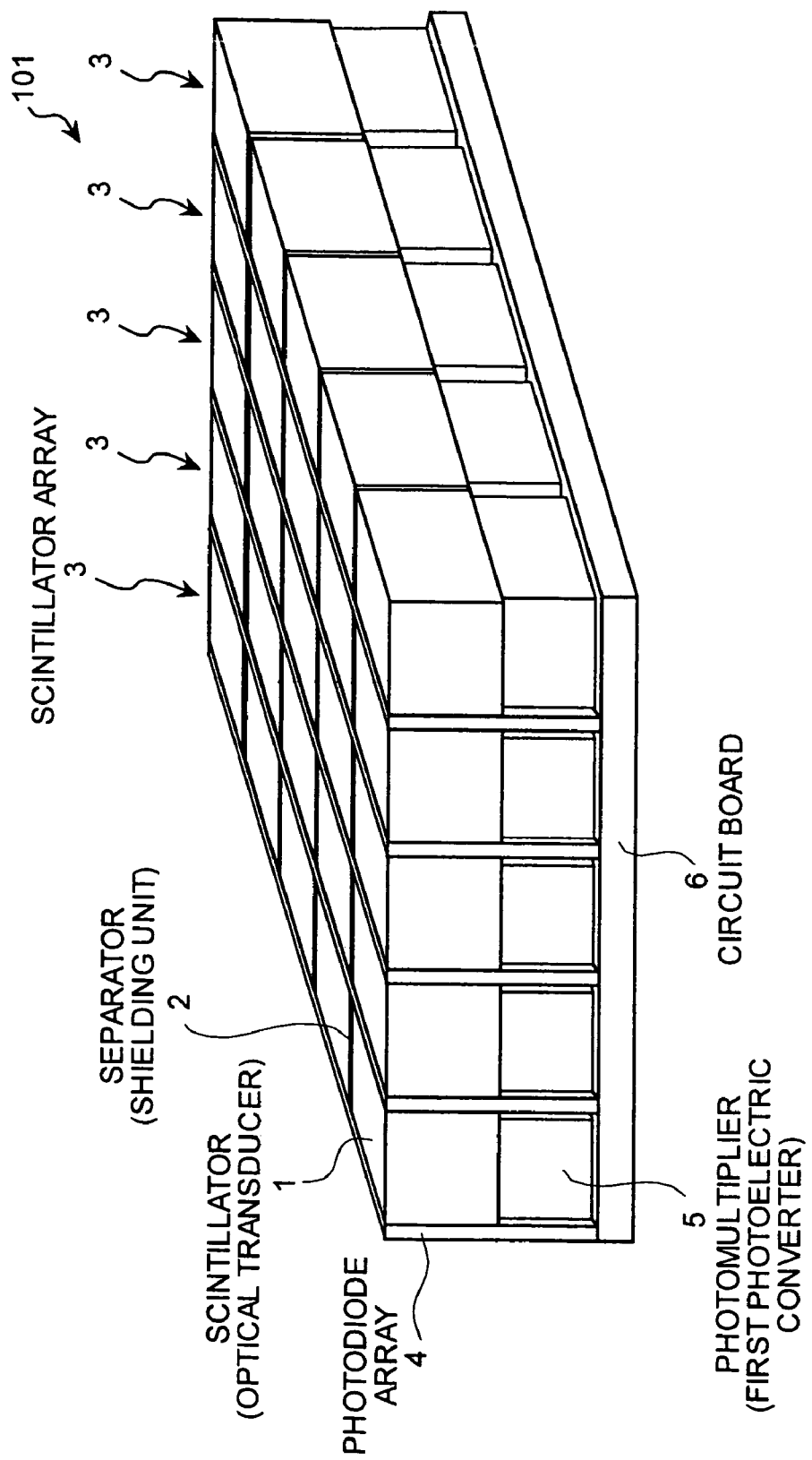
FIG. 1 is a schematic diagram of a whole configuration of a radiation detector according to a first embodiment of the present invention.

A radiation detector according to a first embodiment of the present invention is explained first. FIG. 1 is a schematic diagram of the radiation detector according to the first embodiment. The radiation detector according to the first embodiment includes a plurality of scintillator arrays 3 each including a plurality of scintillators 1 and a plurality of separators 2. The radiation detector according to the first embodiment also includes a plurality of photodiode arrays 4 each arranged on the side plane of the scintillator array 3 in a direction of the radiation reception (a direction from an upper part to a lower part in FIG. 1), and a plurality of photomultipliers 5 arranged on the downstream side of the scintillator array 3 in the direction of the radiation reception in a one-to-one correspondence with the scintillators 1. The radiation detector further includes a circuit board 6 with a circuit formed thereon so as to output electrical signals from the photomultipliers 5 to the outside.

The scintillator 1 functions as an element that corresponds to an optical transducer in the claims of the present invention, and converts incident radiation to light so as to enable photoelectric conversion thereof. In other words, the scintillator 1 has a configuration in which γ-rays as the first radiation and X-rays as the second radiation are incident to the scintillator 1, and has a function of converting these radiations to light having a wavelength so as to enable photoelectric conversion by the photomultiplier 5 and a photodiode 8 explained later. As a specific material forming the scintillator 1, LSO ($Lu_2SiO_5$) is preferably used, but CsI and NaI may also be used. Alternatively, the scintillator 1 can be formed of BGO ($Bi_4Ge_3O_{12}$), $BaF_2$, GSO ($Gd_2SiO_5$), or any of various types of ceramic scintillators.

The separator 2 functions as an element that corresponds to a shielding unit in the claims of the present invention. More specifically, the separator 2 is arranged between adjacent scintillators 1 to prevent occurrence of a so-called cross talk such that the radiation incident to one of the scintillators 1 and the light subjected to photoelectric conversion also enter the other scintillator 1.

Figure 2:
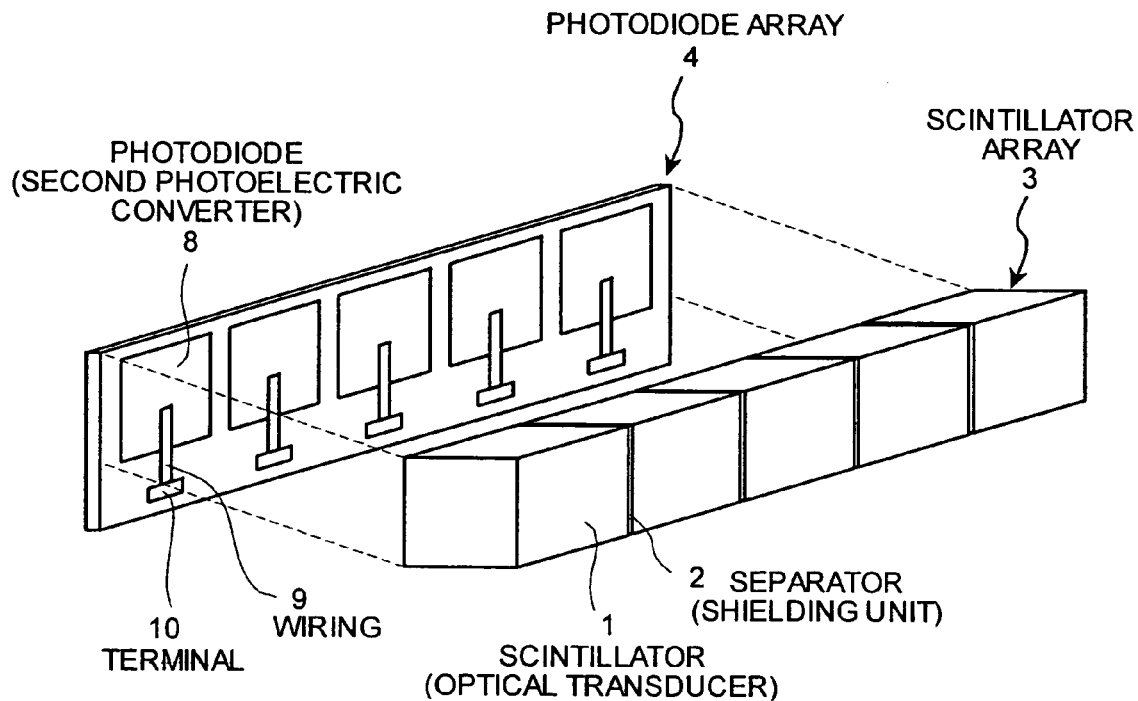
FIG. 2 is a schematic diagram of a photodiode array included in the radiation detector according to the first embodiment.
Figure 3:
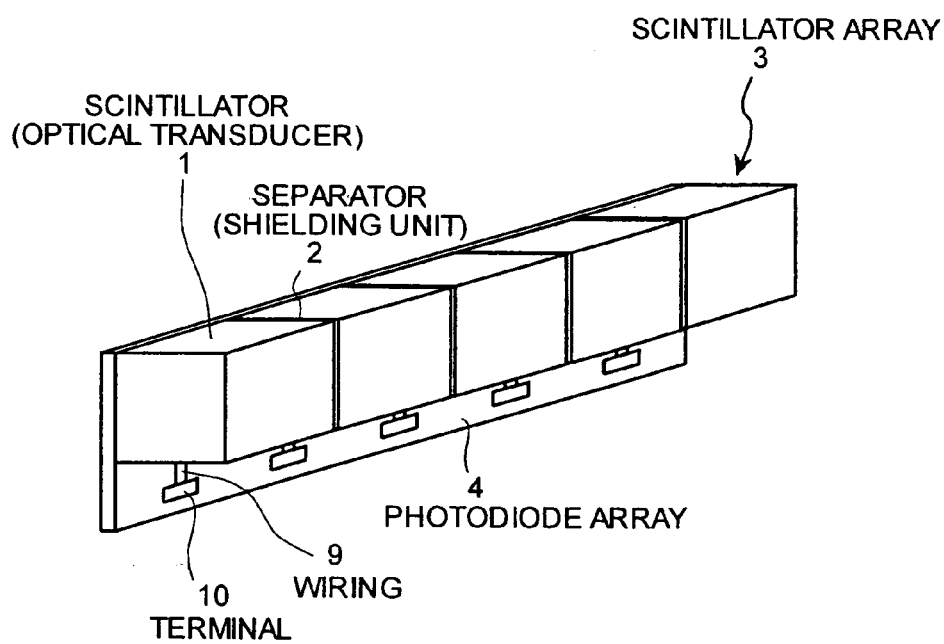
FIG. 3 is a schematic diagram of a state where the photodiode array is combined with a scintillator array.

The photodiode array 4 receives light converted from X-rays by the action of the scintillator 1 to output an electrical signal corresponding to the intensity of the light received. FIG. 2 is a schematic diagram of a state in which the photodiode array 4 and the scintillator array 3 are separated from each other. FIG. 3 is a schematic diagram of a state in which the photodiode array 4 is fixed to the scintillator array 3. As shown in FIG. 2, the photodiodes 8 (each corresponds to a second photoelectric converter in the claims of the present invention) having the same number as that of the scintillators 1 are arranged along the contact plane of the photodiode array 4 with the scintillator array 3. As shown in FIG. 3, the scintillator array 3 and the photodiode array 4 are fixed to each other so as to keep a one-to-one correspondence between scintillators and the photodiodes. Therefore, in the radiation detector according to the first embodiment, a light wave converted from X-rays in each of the scintillators 1 is incident to a corresponding one of the photodiodes 8. The photodiode 8 is electrically connected to a terminal 10 through a wiring 9, and an electrical signal obtained through the photoelectric conversion by the photodiode 8 is output to the outside through the terminal 10.

The photomultiplier 5 outputs an electrical signal corresponding to the intensity of light converted from γ-rays by the action of the scintillator 1. The radiation detector according to the first embodiment is assumed to be used as a radiation receiving mechanism for the PET-CT device. When the radiation detector according to the first embodiment is used in the PET-CT device, the intensity of γ-rays incident to the scintillator 1 is very low. Therefore, the intensity of the light obtained by optically converting the γ-rays in the scintillator 1 is also very low, which makes it difficult to obtain a significant electrical signal in the ordinary photoelectric converting mechanism. Therefore, in the radiation detector according to the first embodiment, the photomultiplier 5 is used when the light converted from the γ-rays is to be photoelectrically converted. This allows even slight light to be reliably detected to output an electrical signal for the light.

Figure 4:
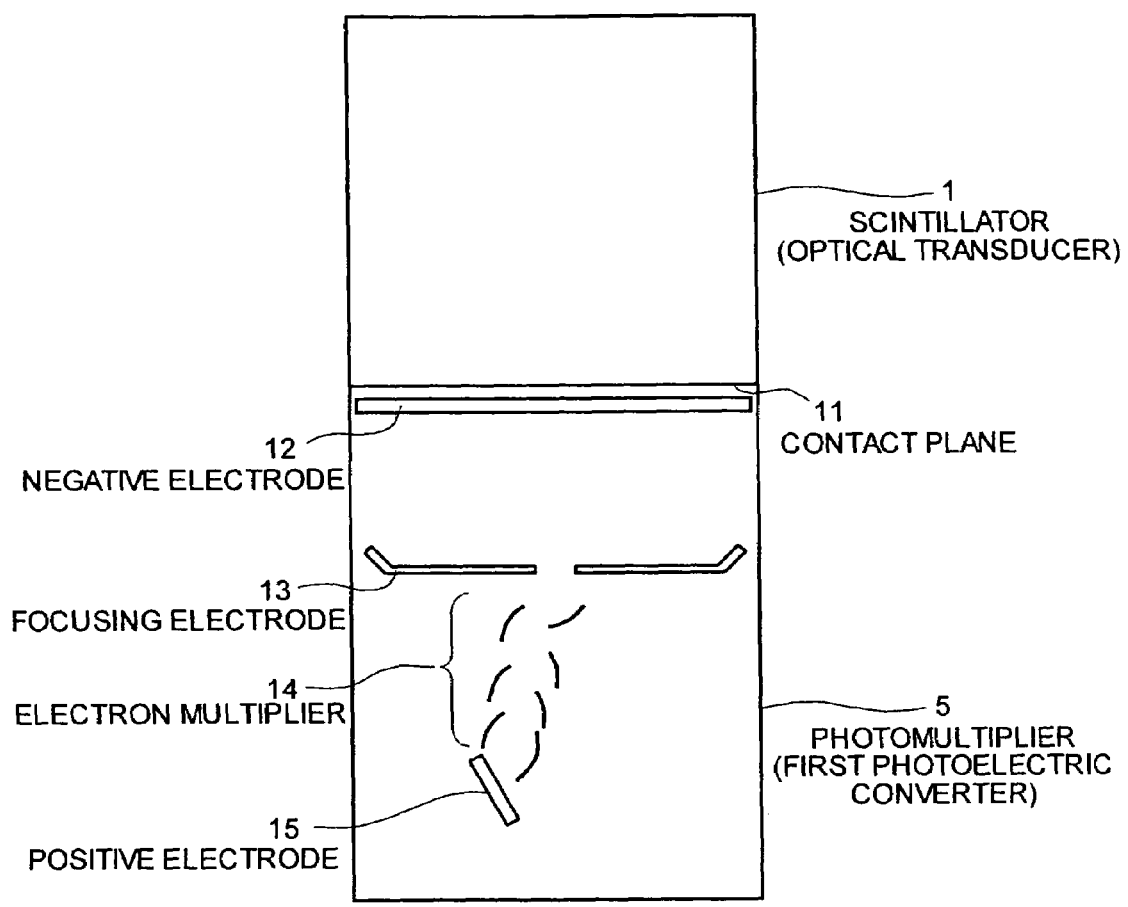
FIG. 4 is a schematic diagram of a photomultiplier.

FIG. 4 is a schematic diagram of a specific configuration of the photomultiplier 5. The scintillator 1 in contact with the photomultiplier 5 is also shown in this figure so as to facilitate understanding of the configuration. As shown in FIG. 4, the photomultiplier 5 includes a negative electrode 12 provided close to a contact plane 11 with the scintillator 1, and also includes a focusing electrode 13, an electron multiplier 14, and a positive electrode 15 that are sequentially provided on the downstream of the negative electrode 12 in the converted light incident direction.

In order to suppress light reflected by a boundary between the scintillator 1 and the photomultiplier 5, for example, silicone oil or the like is applied to the boundary, which allows almost 100% of the light converted from the γ-rays in the scintillator 1 to enter the photomultiplier 5.

The negative electrode 12 is used to generate electrons based on the light incident from the scintillator 1. More specifically, the negative electrode 12 is applied with a predetermined potential, and when the light is incident to the negative electrode 12, electrons corresponding to energy or the like of the incident light are generated by photoelectric effects, and the electrons are emitted from the negative electrode 12. Because the negative electrode 12 has such a photoelectric conversion function, the negative electrode 12 has large area and is disposed close to the contact plane 11 to efficiently receive light incident from the scintillator 1.

The focusing electrode 13 focuses electrons obtained by the action of the negative electrode 12. As explained above, when the radiation detector according to the first embodiment is used as a component of the PET-CT device, the intensity of γ-rays incident to the scintillator 1 is very low, which causes the amount of electrons obtained by the action of the negative electrode 12 to be very small. Therefore, the electrons are focused to one point by the focusing electrode 13. More specifically, the focusing electrode 13 is maintained to a negative potential and has a hole made at the center thereof. Since the electrons obtained by the action of the negative electrode 12 have the negative potential, the focusing electrode 13 is maintained to the negative potential, which causes the electrons to move so as to avoid the surface of the focusing electrode 13. Resultantly, the electrons obtained by the action of the negative electrode 12 pass through the hole made at the center of the focusing electrode 13 to be incident to the electron multiplier 14 in their denser state.

The electron multiplier 14 increases the amount of incident electrons. Specifically, the electron multiplier 14 includes a plurality of electrodes that are formed so that the potentials of the electrodes gradually increase along an advance direction of the electrons. As specific amplification, the electrons incident to the electron multiplier 14 hit on a first electrode, and the first electrode emits a current of electrons more than the incident electrons. Because the electron multiplier 14 includes more than one electrode, such a process as explained above is repeated in each of the electrodes. As a result, the electron multiplier 14 amplifies the incident electrons and outputs them amplified to the positive electrode 15. In order to detect how γ-rays is spatially distributed, it is required to compare the intensities of γ-rays incident to the scintillators 1 with each other. Therefore, amplification efficiency in each electron multiplier 14 of the photomultipliers 5, which are arranged corresponding to the scintillators 1, is assumed to be constant.

The positive electrode 15 receives the electrons amplified by the electron multiplier 14 to output them to the outside. More specifically, the positive electrode 15 is electrically connected to the wiring structure on the circuit board 6 not shown in FIG. 1 to FIG. 4, and has a function of outputting an electrical signal such as a voltage signal according to the electrons received, to the outside through the wiring structure.

The operation of the radiation detector according to the first embodiment is explained below. The radiation detector according to the first embodiment has a function of detecting both the γ-rays representing the first radiation and the X-rays representing the second radiation as explained above. Therefore, an X-ray detecting operation is explained first with reference to FIG. 5, and then a γ-ray detecting operation is explained with reference to FIG. 6.

Figure 5:
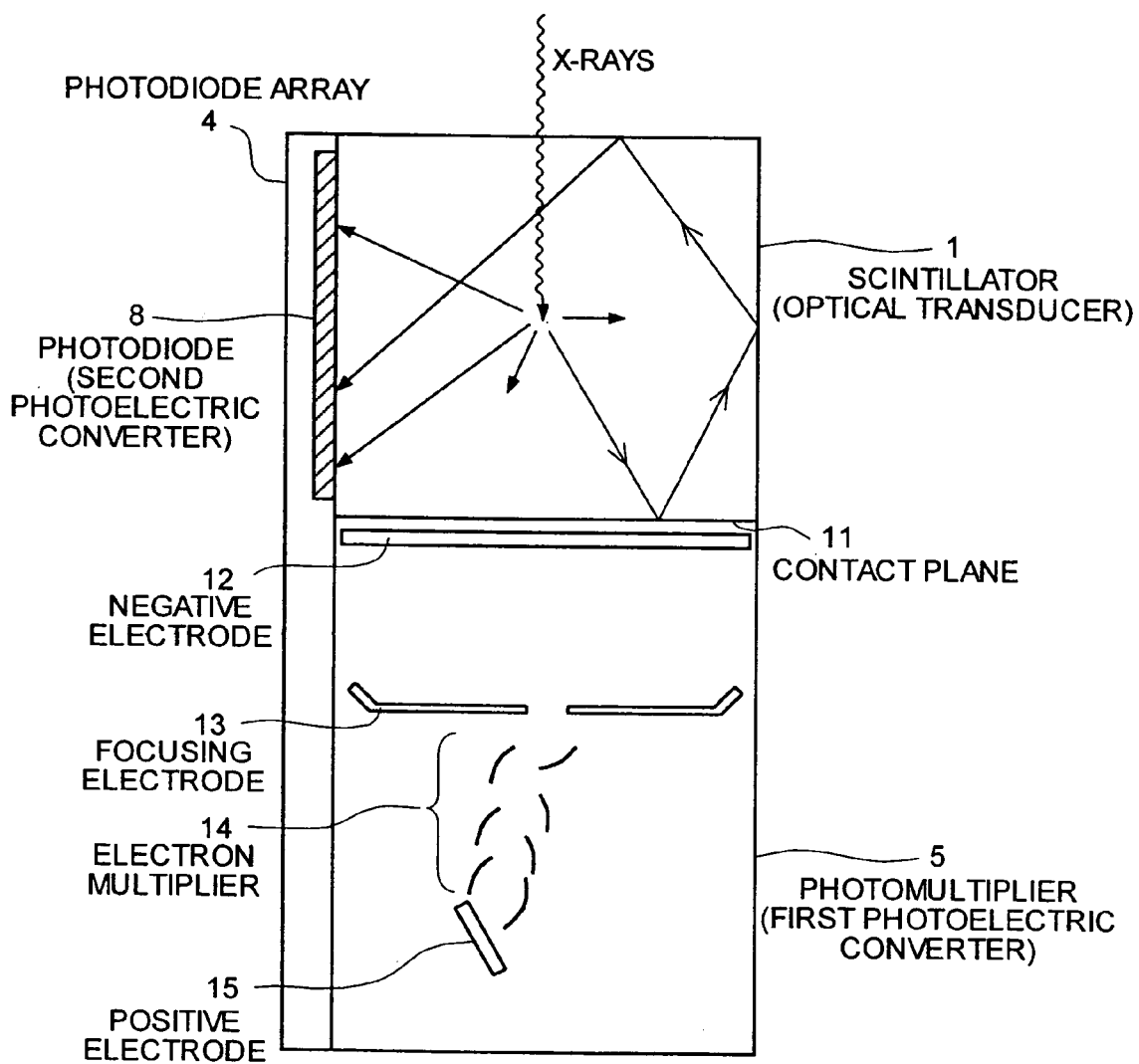
FIG. 5 is a schematic diagram of an X-ray detecting operation by the radiation detector according to the first embodiment.

FIG. 5 is a schematic diagram of the X-ray detecting operation in the radiation detector according to the first embodiment. In the radiation detector according to the first embodiment, X-rays are incident from the outside to the scintillator 1, and the scintillator 1 converts the X-rays to light having a predetermined wavelength by the action thereof.

The light converted by the action of the scintillator 1 is repeatedly reflected to finally incident to the photodiode 8. The photodiode 8 performs photoelectric conversion on the light. The electrical signal obtained through the photoelectric conversion is transmitted to the wiring structure formed on the circuit board 6 via the wiring 9 and the terminal 10, which are not shown in FIG. 5, and the electrical signal is output to the outside through the wiring structure.

In such a process, the photomultiplier 5 stops its function by setting the potential of the negative electrode 12 to the predetermined value or more, and therefore, optical amplification is not performed in the photomultiplier 5. Since the separator 2 is arranged between the adjacent scintillators 1 as explained above, the X-rays incident to any of the scintillators 1 and the light converted obtained from the X-rays are prevented from being incident to another scintillator 1. The same goes for detection of γ-rays as explained later. It is assumed that the γ-rays and the light converted are not output to another adjacent scintillator 1 upon detecting the γ-rays, and that the light converted is not photoelectrically converted by the photodiode 8.

During the operation as shown in FIG. 5, the light converted by the action of the scintillator 1 becomes an amount corresponding to the amount of incident X-rays. The electrical signal obtained by the action of the photoelectric conversion in the photodiode 8 is dependent on the incident amount of the light converted by the action of the scintillator 1. Therefore, the intensity of the electrical signal obtained by the photodiode 8 finally corresponds to the amount of X-rays incident to the scintillator 1.

The operation as shown in FIG. 5 is performed in the scintillators 1 as shown in FIG. 1 and the corresponding photodiodes 8. Therefore, in the radiation detector according to the first embodiment, the amount of X-rays incident to the scintillators 1 and the X-ray spatial distribution in a region where the scintillators 1 are arranged can be detected. Thus, when the radiation detector according to the first embodiment is used in the PET-CT device or the CT device, it is possible to form an image based on the X-ray spatial distribution detected, or to obtain a CT image excellent in spatial resolution.

Figure 6:
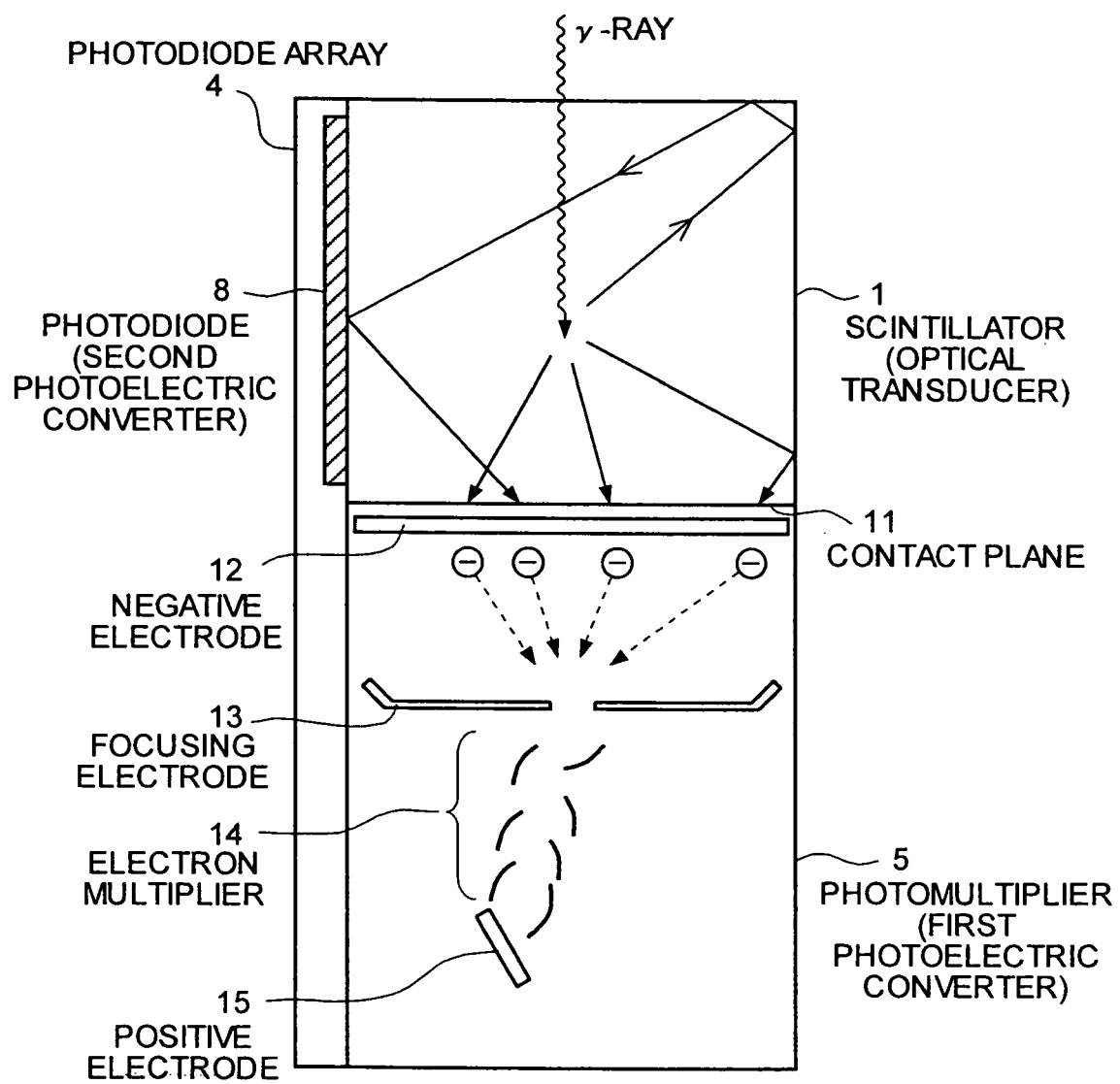
FIG. 6 is a schematic diagram of a γ-ray detecting operation by the radiation detector according to the first embodiment.

The γ-ray detecting operation is explained next. FIG. 6 is a schematic diagram of the γ-ray detecting operation in the radiation detector according to the first embodiment. In the radiation detector according to the first embodiment, γ-rays is incident from the outside to the scintillator 1, and the scintillator 1 converts the γ-rays to predetermined light by the action thereof. The light obtained by the action of the scintillator 1 is repeatedly reflected as necessary to finally incident to the photomultiplier 5 through the contact plane 11.

The light converted incident to the photomultiplier 5 hits on the negative electrode 12, which causes photoelectric effects to produce, and photo-electrons corresponding to the incident amount are emitted from the negative electrode 12. Such photo-electrons are made denser by the electron-focusing action of the focusing electrode 13 to pass through a hole made at the center of the focusing electrode 13, and are incident to the electron multiplier 14.

The electron multiplier 14 has a function of amplifying electrons. Therefore, the amount of electrons is amplified as the electrons are further passing through the electron multiplier 14. The electrons are amplified more as compared with them at the time when they are incident to the electron multiplier 14, and are incident to the positive electrode 15. The positive electrode 15 is electrically connected to the wiring structure on the circuit board 6, and outputs an electrical signal such as a voltage signal according to the amount of electrons incident to the positive electrode 15, to the outside.

During the operation as shown in FIG. 6, the light converted in the scintillator 1 becomes an amount corresponding to the amount of the incident γ-rays. The amount of photo-electrons obtained by the action of photoelectric conversion in the negative electrode 12 included in the photomultiplier 5 corresponds to the amount of the incident light converted. Furthermore, the electron multiplier 14 is formed so that an amplification efficiency therein becomes almost the same as that in each of the photomultipliers 5. Therefore, an electrical signal according to the amount of γ-rays incident to the scintillator 1 is output from the positive electrode 15 to the outside.

The operation as shown in FIG. 6 is performed in the scintillators 1 arranged as shown in FIG. 1 and the photomultipliers 5 arranged corresponding thereto, respectively. Therefore, the radiation detector according to the first embodiment can detect the amount of γ-ray incident to the scintillator 1 and the γ-ray spatial distribution in a region where the scintillators 1 are arranged. Thus, when the radiation detector according to the first embodiment is used in the PET-CT device or the PET device, it is possible to form a PET image based on the γ-ray spatial distribution detected, and to form an image excellent in detection of a lesion such as a malignant tumor.

Some advantages of performing the X-ray detecting operation and the γ-ray detecting operation using the common scintillator 1 as shown in FIG. 5 and FIG. 6 in the radiation detector according to the first embodiment are explained below. The radiation detector 101 has the scintillators 1 each of which receives both the γ-rays representing the first radiation and the X-rays representing the second radiation. Accordingly, relative misalignment will not occur originally between the γ-ray spatial distribution and the X-ray spatial distribution obtained by the radiation detector according to the first embodiment.

This is particularly advantageous when the radiation detector according to the first embodiment is used in the PET-CT device. In other words, a PET image is generated based on the γ-ray spatial distribution detected, and a CT image is generated based on the X-ray spatial distribution detected. Therefore, by using the radiation detector according to the first embodiment that originally prevents occurrence of misalignment in the radiation spatial distributions that are based on image formation, it is possible to prevent occurrence of misalignment between the PET image and the CT image generated in the PET-CT device. Therefore, when the radiation detector according to the first embodiment is used in the PET-CT device, it is possible to realize a device without provision of a mechanism of performing registration between the PET image and the CT image.

The radiation detector according to the first embodiment has another advantage such that manufacturing cost of the radiation detector can be reduced because the common scintillator 1 is used as a mechanism of receiving a plurality of radiations. In other words, the radiation detector according to the first embodiment allows reduction in the number of components by commonly using the radiation receiving mechanism, as compared with a conventional radiation detector including radiation receiving mechanisms each of which is provided for each radiation to be received. The radiation detector according to the first embodiment allows also reduction in the manufacturing cost as compared with that of the conventional radiation detector.

In the radiation detector according to the first embodiment, another advantage obtained by arranging the photomultiplier 5 on the downstream of the scintillator 1 in the direction of the radiation reception and arranging the photodiode array 4 (photodiodes 8) on the side plane of the scintillators 1 in the direction of the radiation reception is explained below. From view points of the registration described above, the position of the photomultiplier 5 that is a first photoelectric converter and the position of the photodiode 8 that is a second photoelectric converter can be set to any positions if light converted by the scintillator 1 is receivable. Therefore, the configuration of the radiation detector may be such that the photomultiplier 5 is arranged on the side plane of the scintillator 1 and the photodiode 8 is arranged on the downstream of the scintillator 1 in the direction of the radiation reception.

However, in order to efficiently focus photo-electrons, the photomultiplier 5 is required to provide a predetermined interval between the negative electrode 12 and the focusing electrode 13. Furthermore, the electron multiplier 14 includes a plurality of electrodes that sequentially amplify, and therefore, formation of the electron multiplier 14 needs a predetermined space. Therefore, the photomultiplier 5 inevitably has a certain amount or more of thickness in a direction perpendicular to a light receiving plane.

On the other hand, the photodiode 8 is formed by a layered structure of a semiconductor material in the direction perpendicular to the light receiving plane, and a film thickness of each layer formed with the semiconductor material becomes as thin as about several micrometers at most. Therefore, the photodiode array 4 can be formed in thickness that is about hundreds of micrometers or less at most including the thickness of the circuit board. Consequently, even when the photodiode array 4 is arranged on the side plane of the scintillators 1 in the direction of the radiation reception, a gap produced between adjacent scintillators 1 can be decreased. In other words, by arranging the photodiode array 4, not the photomultipliers 5, on the side plane of the scintillators 1 in the direction of the radiation reception, the scintillators 1 can be arranged densely, which makes it possible to realize a radiation detector with high spatial resolution.

A radiation detector according to a second embodiment of the present invention is explained below. The radiation detector according to the second embodiment includes a plurality of scintillators, a plurality of photomultipliers each arranged on the downstream of the scintillator in the direction of the radiation reception, and a plurality of photodiodes arranged on the side plane in the direction of the radiation reception, in the same manner as the first embodiment. On the other hand, the radiation detector according to the second embodiment outputs an electrical signal obtained in the photodiode not through a terminal provided on the downstream side in the direction of the radiation reception but through a terminal provided along the extension in the array direction of the photodiodes. In the explanation below, the same names and signs are assigned to the components corresponding to these according to the first embodiment, and the rest of the components are also the same as these according to the first embodiment unless otherwise specified.

Figure 7:
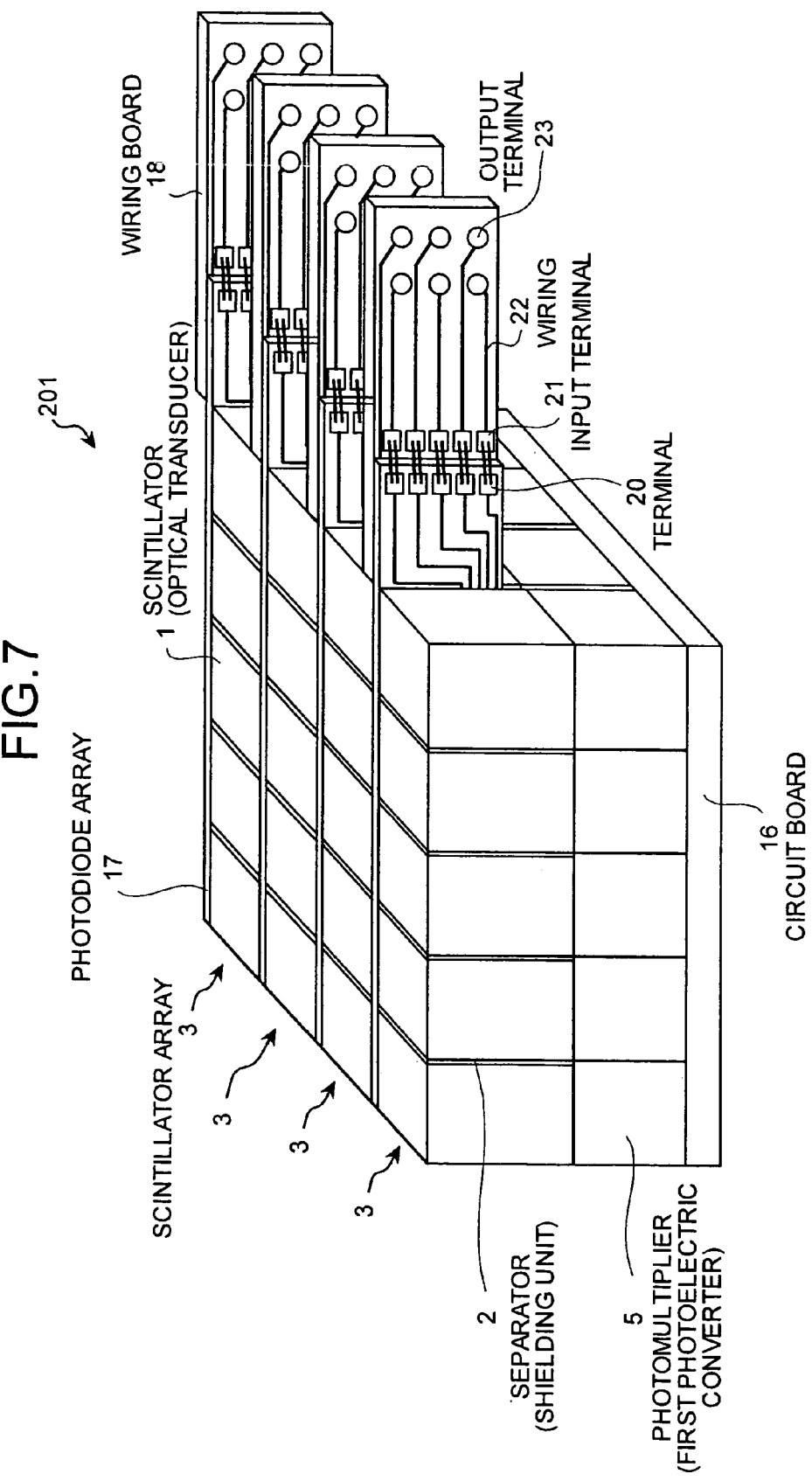
FIG. 7 is a schematic diagram of a whole configuration of a radiation detector according to a second embodiment of the present invention.

FIG. 7 is a schematic diagram of the configuration of the radiation detector according to the second embodiment. The radiation detector 201 includes a plurality of the scintillator arrays 3 each including a plurality of scintillators 1 and a plurality of separators 2. The radiation detector also includes a plurality of photomultipliers 5 arranged on the downstream side of the scintillators 1 in the direction of the radiation reception in a one-to-one correspondence with the scintillators 1, and a circuit board 16 provided under the photomultipliers 5.

On the other hand, a photodiode array 17 is arranged on the side plane of the scintillators 1 in the direction of the radiation reception, and a wiring board 18 is arranged along the extension in the array direction of the photodiodes in the photodiode array 17. The wiring board 18 is electrically connected to a wiring structure included in the photodiode array 17. As explained above, the radiation detector according to the second embodiment has the same configuration as that of the first embodiment relating to the scintillator 1 and the photomultiplier 5, while has the configuration in which a position where an electrical signal output from the photodiode array 17 is extracted is different from that of the first embodiment.

Figure 8:
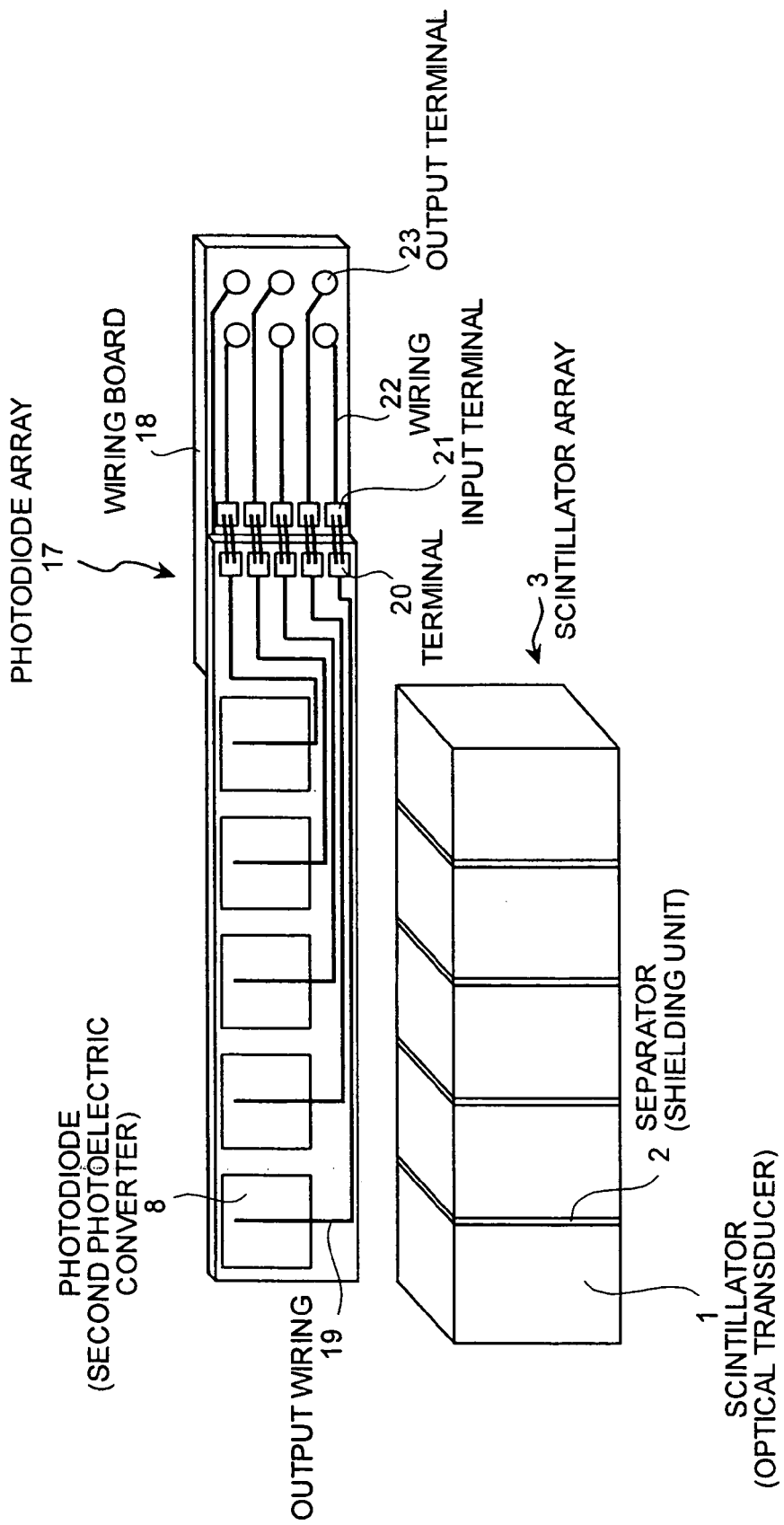
FIG. 8 is a schematic diagram of a photodiode array included in the radiation detector according to the second embodiment.

FIG. 8 is a schematic diagram of a positional relation between the scintillator array 3, the photodiode array 17, and the wiring board 18 in the radiation detector according to the second embodiment. In the radiation detector according to the second embodiment, the photodiode 8 included in the photodiode array 17 has the same configuration as that of the first embodiment. However, an output wiring 19 that outputs an electrical signal obtained in the photodiode 8 is extended from the photodiode 8 toward the downstream in the direction of the radiation reception, is further extended along the array direction of the photodiodes 8 in the photodiode array 17 (horizontal direction in FIG. 8), and is electrically connected to a terminal 20 provided at the end in the array direction. The terminal 20 may be directly connected to an external circuit, but the second embodiment of the present invention employs a configuration in which the wiring board 18 is further provided along the extension of the photodiode array 17 in the array direction. The terminal 20 and an input terminal 21 formed on the wiring board 18 are electrically connected through bonding wire, and the electrical signal is output to the outside through wiring 22 and an output terminal 23 formed on the wiring board 18.

In the second embodiment, the arrangement of the photomultiplier 5 and the photodiode 8 with respect to each of the scintillators 1 is the same as explained in the first embodiment. By providing these components to share the scintillator 1, the same advantage as that according to the first embodiment can be obtained. Furthermore, the radiation detector according to the second embodiment has an advantage due to employment of the configuration in which the electrical signal is output in the array direction of the photodiodes 8 (horizontal direction of FIG. 8).

In other words, the first embodiment employs the configuration in which the electrical signal obtained by the photodiode 8 is output to the wiring structure formed on the circuit board 6 through the wiring 9 and the terminal 10 and is output to the outside through the wiring structure. When the configuration is employed, it is required to electrically connect between the wiring structure formed on the surface of the circuit board 6 and the terminals 10 arranged on the surface of the photodiode array 4 that is arranged perpendicularly to the surface of the circuit board 6. Therefore, when electrical connection is to be ensured using wire bonding or the like, a certain amount of area is required for the electrical connection, which causes the size of the radiation detector to increase accordingly. Moreover, the terminals 10 and the wiring structure on the circuit board 6 are provided in mutually perpendicular positions, which may cause the wiring to be electrically disconnected caused by physical impact from the outside.

Therefore, the radiation detector according to the second embodiment outputs the electrical signal obtained by the photodiode 8 to the outside not through the wiring structure on the circuit board 6 but through another system. The second embodiment also employs the configuration in which the terminal 20 is electrically connected to the input terminal 21 on the wiring board 18 through wire bonding, but has a configuration in which the photodiode array 17 and the wiring board 18 are arranged in parallel with each other. Therefore, the radiation detector 201 allows realization of a configuration in which a spatial region for the wire bonding is less required and electrical disconnection does not easily occur by the physical impact from the outside. Furthermore, there is another advantage such that the need for providing the wiring structure on the circuit board 6 for outputting the electrical signal obtained by the photodiode 8 is eliminated, which allows the number of wires of the wiring structure on the circuit board 6 to be reduced.

A radiation detector according to a third embodiment of the present invention is explained below. The radiation detector according to the third embodiment has the photomultiplier arranged on the downstream of the scintillator in the direction of the radiation reception in the same manner as that of the first embodiment and the second embodiment, and has the photodiode arranged on the upstream of the scintillator in the direction of the radiation reception. In the explanation below, the same names and signs are assigned to the components corresponding to these according to the first embodiment and the second embodiment, and the rest of the components are also the same as these according to the first embodiment and the second embodiment unless otherwise specified.

Figure 9:
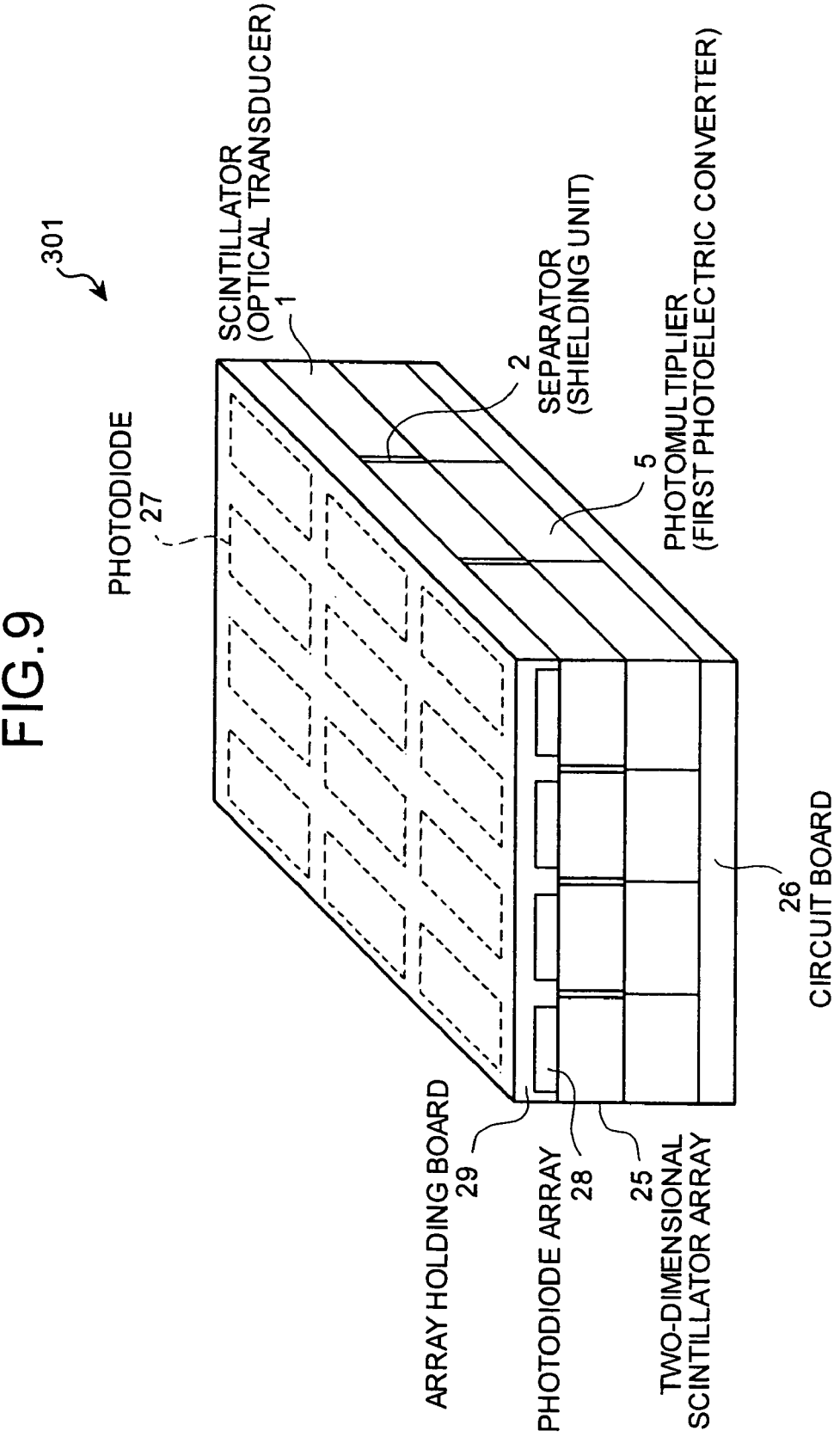
FIG. 9 is a schematic diagram of a whole configuration of a radiation detector according to a third embodiment of the present invention.

FIG. 9 is a schematic diagram of a whole configuration of the radiation detector according to the third embodiment. The radiation detector according to the third embodiment includes a two-dimensional scintillator array 25 including the scintillators 1 arranged in a two-dimensional matrix and the separators 2 each arranged between adjacent scintillators 1. The radiation detector also includes the photomultipliers 5 arranged on the downstream side of the scintillators 1 in the direction of the radiation reception, and a circuit board 26 including the wiring structure for outputting electrical signals from the photomultipliers 5.

The radiation detector according to the third embodiment further includes a plurality of photodiode arrays 28 each including one-dimensional array structure of photodiodes 27 each of which corresponds to the scintillator 1 and is provided on the upstream side thereof in the direction of the radiation reception, and an array holding board 29 that holds the photodiode arrays 28.

Figure 10:
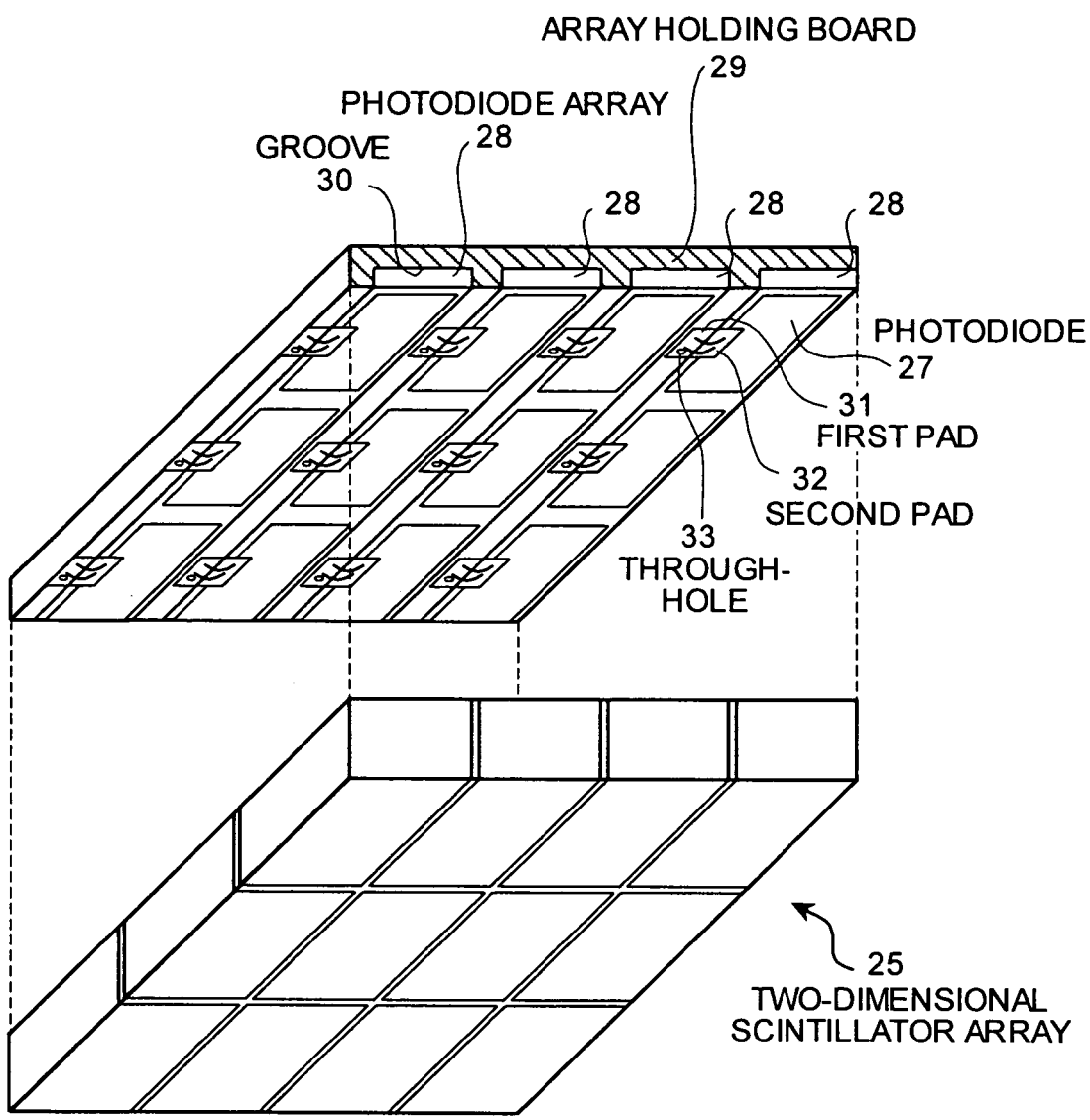
FIG. 10 is a schematic diagram of a whole configuration of an array holding board and a photodiode array included in the radiation detector according to the third embodiment.

FIG. 10 is a schematic diagram of the configuration of the array holding board 29 and the photodiode array 28 in the radiation detector 301. The array holding board 29 includes a plurality of grooves 30, into which the photodiode arrays 28 are fitted, respectively, formed on its contact plane with the two-dimensional scintillator array 25. The array holding board 29 also includes a first pad 31 and a through-hole 33 corresponding to each of the photodiodes 27 in order to receive the electrical signal output from the photodiode 27.

On the other hand, the photodiode array 28 to be fitted into the groove 30 is arranged in a one-dimensional array based on the arrangement of the scintillators 1. The photodiode array 28 includes the photodiodes 27 each having a light receiving plane on a plane of the photodiode array 28 in contact with the two-dimensional scintillator array 25, and a second pad 32 for outputting the electrical signal corresponding to each of the photodiodes 27.

Figure 11:
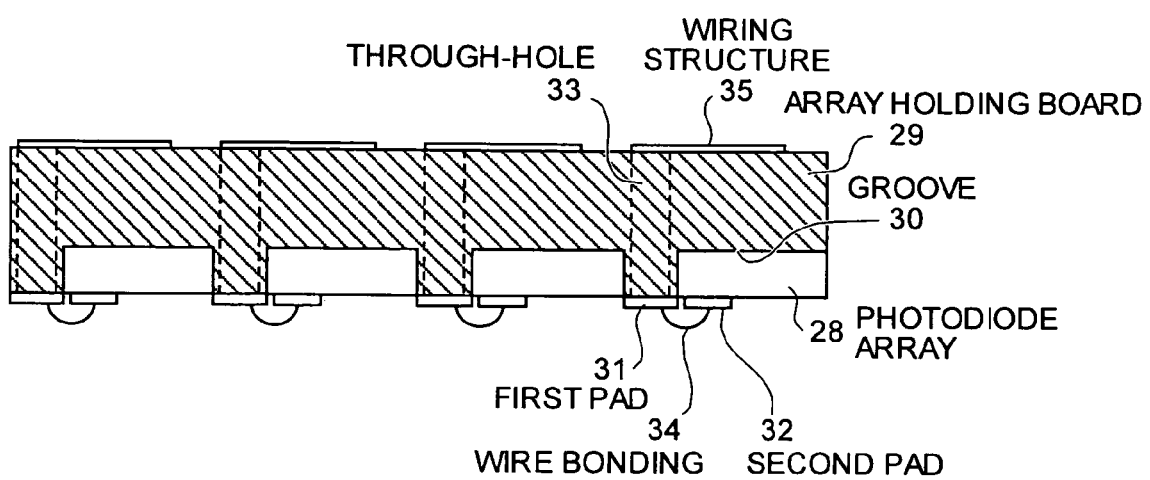
FIG. 11 is a schematic diagram of a correlation between the photodiodes included in the photodiode array and a wiring structure included in the array holding board.

FIG. 11 is a schematic diagram of an electrical interconnection between the array holding board 29 and the photodiode array 28 fitted into the groove 30 formed on the array holding board 29. The groove 30 is formed so as to have a depth such that the surface of the photodiode array 28 fitted into the groove 30 and the surface of the array holding board 29 are flush with each other.

As a result, the second pad 32 provided corresponding to each of the photodiodes 27 on the surface of the photodiode array 28 and the first pad 31 formed on the surface of the array holding board 29 form the same plane. Both the first pad 31 and the second pad 32 are electrically connected to each other through wire bonding 34. The first pad 31 is electrically connected to a wiring structure 35 arranged over the top surface of the array holding board 29 through a through-hole 33 formed by penetrating the array holding board 29. Therefore, in the third embodiment, an electrical signal output from the photodiode 27 is output to the outside from the wiring structure 35 through the second pad 32, the wire bonding 34, the first pad 31, and the through-hole 33.

As explained above, in the radiation detector according to the third embodiment according to the third embodiment, the photodiode array 28 and the array holding board 29 are arranged on the upstream side of the scintillators 1 in the direction of the radiation reception. The photodiode array 28 and the array holding board 29 are formed with a silicon substrate or the like as a parent material. The photodiode 27 formed on the photodiode array 28 does not have a function of performing direct photoelectric conversion on radiation.

Therefore, even when the photodiode array 28 and the array holding board 29 are arranged on the upstream side of the scintillators 1 in the direction of the radiation reception, incident radiation can enter the scintillator 1 without being blocked by the photodiode array 28 or the like. Therefore, the same advantage as that of the first embodiment and the second embodiment can be obtained even when the photodiode array 28 is arranged on the upstream side in the direction of the radiation reception. Furthermore, by arranging the photodiode 27 on the upstream side of the scintillator 1 in the direction of the radiation reception, there is no need to arrange the photodiode array between adjacent scintillators 1, which allows the scintillators 1 to be more densely arranged accordingly.

The third embodiment has the scintillator array in which the scintillators 1 are two-dimensionally arranged, but has the photodiode array 28 in plural numbers each in which the photodiodes 27 are one-dimensionally arranged. The photodiodes may be formed simply in a two-dimensional matrix on an identical board, but the one-dimensional arrangement is employed in the third embodiment by reason of yield or the like.

In other words, if a two-dimensional photodiode array with the photodiodes formed in the two-dimensional matrix on a single board is used, the number of photodiodes to be formed on the board becomes enormous. Therefore, if even one of the photodiodes in the two-dimensional photodiode array becomes faulty, then this two-dimensional photodiode array has to be replaced with another two-dimensional photodiode array, which causes manufacturing yield to be reduced. Because of this reason, a plurality of one-dimensional photodiode arrays is provided in the third embodiment. Therefore, even if any one of the photodiodes 27 becomes faulty, only one photodiode array 28 including the faulty photodiode 27, out of the photodiode arrays 28, is replaced with another one, which allows reduction in manufacturing yield to be suppressed.

There is still another advantage due to the case such that an electrical signal output from the photodiode 27 is output to the outside through the through-hole 33. As explained above, the radiation detector according to the third embodiment has the photodiodes 27 that are arranged on the upstream side of the scintillators 1 in the direction of the radiation reception, and therefore, all the photodiodes 27 are arranged on the identical plane, which is different from the first embodiment and the second embodiment.

When such a configuration as explained above is employed, by forming the wiring structure for output on the same plane as the light receiving plane of the photodiode 27 in the same manner as that of the first embodiment and the second embodiment, the number of photodiodes 27 formed on the plane steeply increases. Resultantly, the number of lines on the wiring structure increases accordingly. Therefore, the occupancy area of the light receiving plane of the photodiode 27 relatively decreases, which causes the detection sensitivity of X-rays to decrease.

In the third embodiment, to avoid such a problem, the wiring structure for output is formed not on the plane identical to the light receiving plane of the photodiode 27, but on the plane different from the light receiving plane via the through-hole 33. Therefore, even if a large number of photodiodes 27 are arranged on the identical plane, it is possible to suppress reduction in light receiving area of the photodiode 27, which allows high detection sensitivity of X-rays.

Although the present invention has been explained in the first to third embodiments, the present invention is not limited by the embodiments, and various other embodiments, modifications and applications may be realized by those skilled in the art. For example, a radiation detector including an optical transducer that detects γ-rays as the first radiation and receives neutron beam as the second radiation may be formed. Recently, in the field of non-destructive inspection, inspection equipment that captures image data on an in-vivo structure by using a difference in transmission characteristics between the γ-rays and the neutron beam is proposed. Therefore, the radiation detector according to the present invention can be used in the inspection equipment. The inspection equipment performs image formation based on γ-ray spatial distribution and neutron-beam spatial distribution. Therefore, by using the radiation detector free from relative misalignment in the spatial distributions of the different radiations, accurate non-destructive inspection can be conducted.

As the mechanism of performing photoelectric conversion on light obtained by the scintillator 1, for example, a photoresistor other than the photomultiplier 5 can be used. In the present invention, specific configurations of the first photoelectric converter and the second photoelectric converter can be freely selected according to the wavelength and the intensity of light obtained through optical conversion of the scintillator 1. Therefore, there is no need to limit the photoelectric converter to the photodiode 8. Likewise, as the optical transducer, not only the scintillator 1 but also any device may be used if the device can subject incident two or more types of radiations to optical conversion.

INDUSTRIAL APPLICABILITY

As described above, a radiation detector according to the present invention is suitable not only for obtaining images inside a body of a patient with a single device, for example, of a PET, but also for obtaining images inside the body of the patient with a PET-CT device, in which the PET device and a CT device are combined, simultaneously capturing images using both the devices.

The invention claimed is:

1. A radiation detector that detects spatial distribution of a first radiation and a second radiation, the radiation detector comprising:
a plurality of optical transducers, each of which converts the first radiation to a first light having a first wavelength, and converts the second radiation to a second light having a second wavelength;
a shielding unit that is arranged between adjacent ones of the optical transducers to shield the first radiation, the second radiation, the first light, and the second light;
a plurality of first photoelectric converters, each of which corresponds to a respective one of the optical transducers, and outputs a first electrical signal based on intensity of the first light; and
a plurality of second photoelectric converters, each of which corresponds to a respective one of the optical transducers, and outputs a second electrical signal based on intensity of the second light.

2. The radiation detector according to claim 1, wherein the first radiation is γ-rays, and
the first photoelectric converter includes a photomultiplier.

3. The radiation detector according to claim 1, wherein the second radiation is X-rays, and
the second photoelectric converter includes a photodiode.

4. A radiation detector that detects spatial distribution of a first radiation and a second radiation, the radiation detector comprising:
a plurality of optical transducers that converts the first radiation to a first light having a first wavelength, and converts the second radiation to a second light having a second wavelength;
a shielding unit that is arranged between the optical transducers to shield the first radiation, the second radiation, the first light, and the second light;
a plurality of first photoelectric converters that corresponds to each of the optical transducers, and outputs a first electrical signal based on intensity of the first light; and
a plurality of second photoelectric converters that corresponds to each of the optical transducers, and outputs a second electrical signal based on intensity of the second light, wherein
the first photoelectric converters are arranged on a downstream of a direction of the first radiation and the second radiation with respect to the optical transducer, and
the second photoelectric converters are arranged on a side of the direction of the first radiation and the second radiation with respect to the optical transducer.

5. The radiation detector according to claim 4, wherein
the optical transducer includes a scintillator array in which scintillators are arranged in one-dimension, and
the second photoelectric converters include a photodiode array in which photodiodes are arranged in one-dimension on a side of the scintillator array in the direction of the first radiation and the second radiation so that each of the photodiodes corresponds to each of the scintillators.

6. The radiation detector according to claim 5, wherein the photodiode array includes a wiring structure extended from the photodiodes to the downstream of the direction of the first radiation and the second radiation.

7. The radiation detector according to claim 5, wherein the photodiode array includes a wiring structure extended from the photodiodes to the downstream of the direction of the first radiation and the second radiation, and further extended along the photodiode array.

8. The radiation detector according to claim 5, wherein a plurality of the scintillator arrays and a plurality of the photodiode arrays are arranged in parallel to form a two-dimensional array.

9. The radiation detector according to claim 1, wherein
the first photoelectric converters are arranged on the downstream of an incident direction of the first radiation and the second radiation with respect to the optical transducer, and
the second photoelectric converters are formed of an element that is transparent to the first radiation and the second radiation, and arranged on upstream of the incident direction of the first radiation and the second radiation with respect to the optical transducer.

* * * * *